United States Patent [19]

Beranek et al.

[11] Patent Number: 5,692,086
[45] Date of Patent: Nov. 25, 1997

[54] OPTICAL FIBER LOCKING SUBMOUNT AND HERMETIC FEEDTHROUGH ASSEMBLY

[75] Inventors: Mark W. Beranek, Bellevue; Eric Y. Chan, Mercer Island; David Gastellum, Kent; Mostafa Rassaian, Bellevue, all of Wash.; Mark Voitek, Andover, N.J.

[73] Assignee: The Boeing Company, Seattle, Wash.

[21] Appl. No.: 548,179

[22] Filed: Oct. 25, 1995

[51] Int. Cl.$^6$ ........................................... G02B 6/255
[52] U.S. Cl. .................................................... 385/94
[58] Field of Search ................................ 385/88–94

[56] References Cited

U.S. PATENT DOCUMENTS

| | | | |
|---|---|---|---|
| 1,174,137 | 7/1916 | Fulda | 385/88 |
| 2,224,145 | 12/1940 | Dugan et al. | 385/88 |
| 4,346,294 | 8/1982 | Albaugh et al. | 250/227 |
| 4,580,027 | 4/1986 | Thorwarth | 219/85 M |
| 4,741,591 | 5/1988 | Grabbe et al. | 385/88 |
| 4,936,646 | 6/1990 | Enochs et al. | 385/88 |
| 4,997,253 | 3/1991 | Enochs | 385/88 |
| 5,066,091 | 11/1991 | Stoy et al. | 385/98 |
| 5,076,688 | 12/1991 | Bowen et al. | 250/227.11 |
| 5,222,170 | 6/1993 | Bargar et al. | 385/88 |
| 5,228,101 | 7/1993 | Lebby et al. | 385/91 |

*Primary Examiner*—Akm E. Ullah
*Attorney, Agent, or Firm*—Mary Y. Redman

[57] ABSTRACT

An optoelectronic package includes an optical fiber cable assembly and feedthrough assembly which provide high performance and high reliability optical fiber alignment, locking and sealing. An optical fiber is fed through a nose tube into the package. The fiber is selectively metallized at its end. A solder lock joint on a substrate on the package floor preferably of an SnAg- based or SnSb- based solder. It surrounds at least part of the metallized portion of the fiber so as to hold the fiber in its desired position, in alignment with an optoelectronic device in the package. With Sn metallization on the fiber, this results in a highly reliable solder lock joint. A solder seal joint forms a hermetic seal between the nose tube and the Au metallized fiber. This solder is preferably 80Au20Sn. A rigid cylindrical seal tube sleeve insert on the fiber is designed to guide the fiber into the nose tube without bending or damaging the fiber.

17 Claims, 3 Drawing Sheets

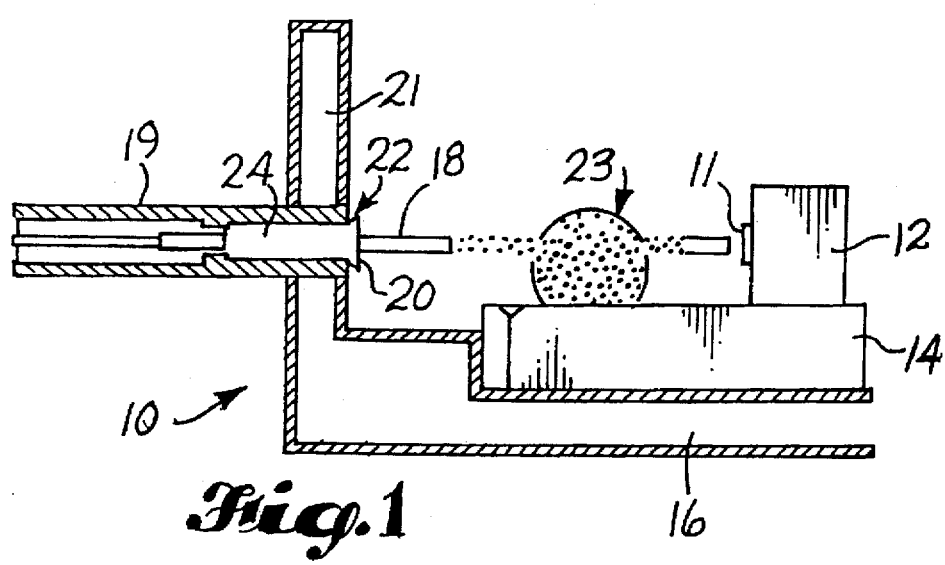
*Fig.* 1
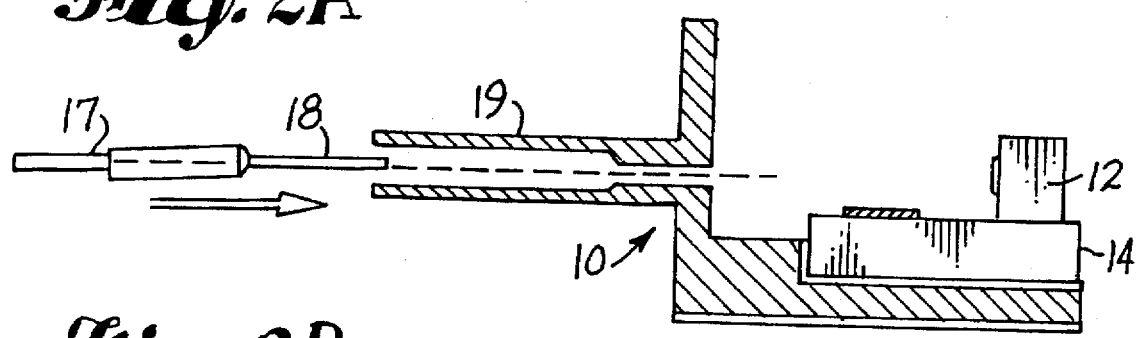
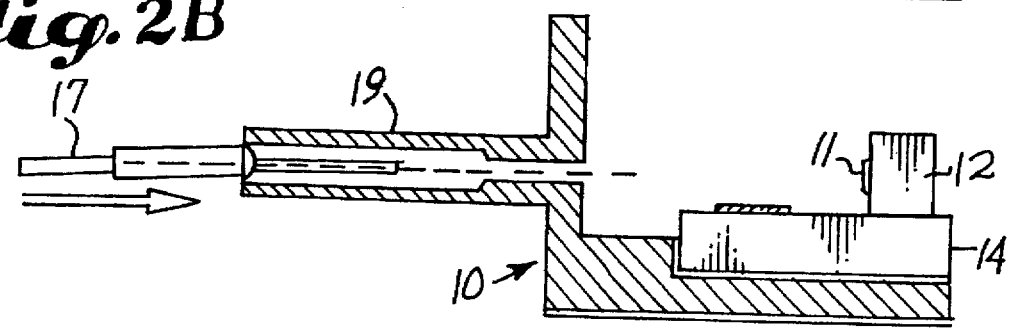
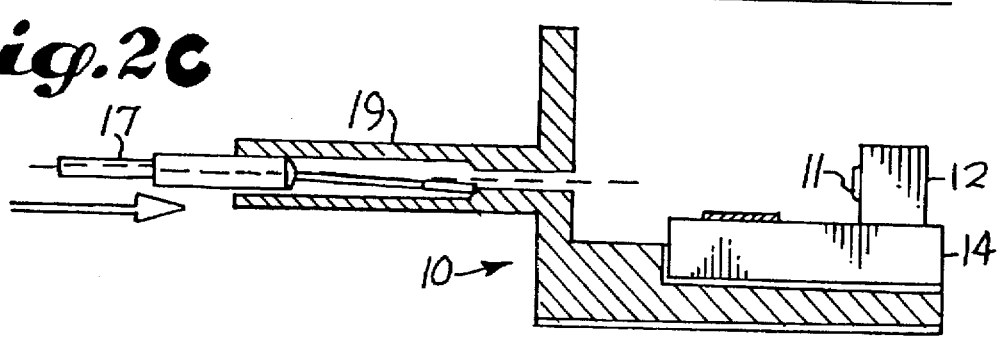

OPTICAL FIBER LOCKING SUBMOUNT AND HERMETIC FEEDTHROUGH ASSEMBLY

FIELD OF THE INVENTION

This invention relates to the field of packaging for optoelectronic devices and optical fiber locking and alignment.

BACKGROUND OF THE INVENTION

Optoelectronic transmitters and receivers that will be installed on commercial airplanes must operate for twenty years in potentially dusty, humid, corrosive and mechanically turbulent environments, and over a temperature range of −40° to +125° C. Long-term reliability in such hostile operating conditions requires hermetic sealing of the optoelectronic devices inside a metal hybrid package. In a typical arrangement, optical signals are transferred to and from the optoelectronic device inside the package by an optical fiber. The fiber is solder sealed inside a nose tube which is brazed to the sidewall of the package. This type of hybrid electrical-optical package arrangement is commonly referred to as a "fiber-pigtailed" hybrid package. The process for interfacing the fiber to the package is called "pigtailing."

Pigtailing optoelectronic packages for avionics applications is challenging because of the scarcity of robust packaging technology solutions for problems crucial to successful operation and commercial success. The methods used in locking optical fibers inside optoelectronic packages must be reproducible, and the materials must be reliable. The materials used to seal optical fiber through the package sidewall must be reliable. Optical fiber locking and sealing manufacturing methods must be labor efficient with high yields. To meet industry performance standards, hermeticity must be sustained through 1,000 temperature cycles between −40° and +125° C. Likewise, optical fiber-to-device coupling must remain efficient and stable after 1,000 temperature cycles between −40° and +125° C.

A successful packaging technique must achieve both reliable hermetic sealing and precise optical fiber locking. Current techniques have not dealt with both of these packaging problems in a manner which meets the performance demands of avionics applications.

In one form of a typical optoelectronic package, an optical fiber is held in proper alignment by a fiber lock joint formed from a solder preform. After the fiber is inserted through the preform and aligned properly, the preform is heated to flow around the fiber and form the lock joint. After this operation, the feedthrough joint where the fiber enters the package is heated to form a hermetic seal. Since package dimensions are small, heating the feedthrough joint will result in heating of the fiber lock joint area. Thus, the soldering hierarchy must be considered in choosing materials for the hermetic seal and the fiber lock joint.

Soft, low melting point solders based on SnPb are sometimes used to form hermetic seals in less demanding applications. However, hermetic feedthrough joints using these soft solder materials do not maintain hermeticity after temperature cycling 1,000 times between −40° C. and +125° C. Good reliability of hermetic fiber feedthrough may be obtained by sealing unmetallized fiber inside a metal (i.e., NiFe) tube with solder glass. However, the solder glass liquidus temperature is too high (>350° C.) for implementing in situ solder glass sealing processes in packages containing fiber locking solders. Fiber locking solder joints inside the package will melt when the solder glass is reflowed at the seal nose tube. Thus, solder glass sealed nose tubes are not suitable for optoelectronic packages using a solder preform optical fiber locking technology.

SUMMARY OF THE INVENTION

An optoelectronic device package according to a preferred embodiment of the invention, includes an optical fiber cable assembly and feedthrough assembly which provide high performance and high reliability optical fiber alignment, locking and sealing. In a preferred embodiment, the package includes a housing having a sidewall with an aperture therethrough and a floor with a substrate thereon. The fiber is selectively metallized at the end which is within the housing. A solder lock joint on the substrate is formed of a reflowed solder preform, preferably a SnAg- based or SnSb- based solder. It surrounds at least part of the metallized portion of the fiber so as to hold the fiber in its desired position, in alignment with an optoelectronic device in the package. With a Sn metallization on the fiber, this results in a highly reliable solder lock joint. A solder seal joint forms a hermetic seal between the aperture and the fiber. This solder is preferably one containing Au and Sn, such as 80Au20Sn, which has a melting point of 280° C.

In a preferred embodiment, a nose tube with gold plating on its interior surface is mounted to the exterior of the housing. The fiber is a commercially available sleeved fiber which, in a preferred embodiment, has its sleeving terminated at one end with a cylindrical seal tube sleeve insert attached to the fiber with heat shrink tubing. This insert is a rigid sleeve which can be made of metal, plastic, ceramic, or the like. The optical fiber protrudes from the insert such that the entire metallized portion of the fiber and a short length of polymer coated fiber protrudes from the rigid sleeve insert. The fiber is sealed into the insert with a high temperature adhesive such as an epoxy that is chemically resistant to solder flux and solder flux feedthrough cleaning solvents. The insert is designed to guide the fiber into the nose tube without bending or damaging the fiber.

BRIEF DESCRIPTION OF THE DRAWINGS

FIG. 1 is a cross-sectional view of an optoelectronic package according to a preferred embodiment of the invention.

FIGS. 2A, 2B, and 2C show in sequence the process of insertion of a fiber through a nose tube in a typical prior art device.

DETAILED DESCRIPTION OF A PREFERRED EMBODIMENT

Figure 3A:
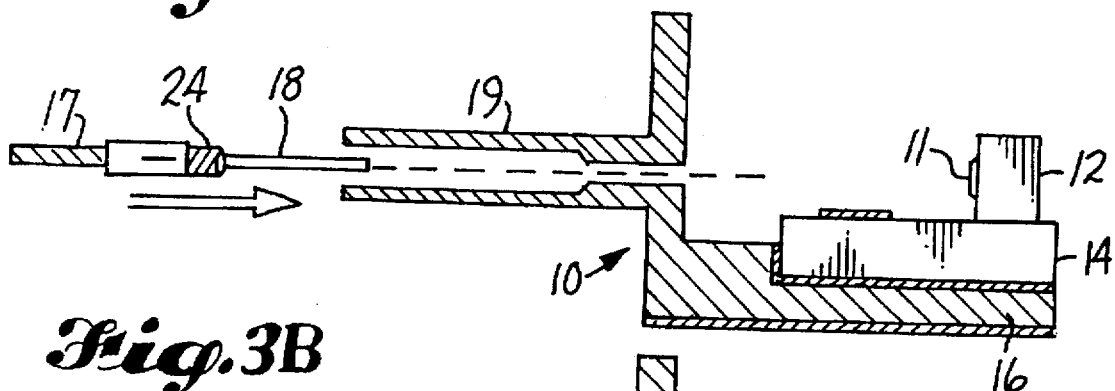
FIGS. 3A, 3B, and 3C show in sequence the process of insertion of a fiber through a nose tube in an optoelectronic package according to a preferred embodiment of the invention.

In the preferred embodiment illustrated in FIG. 1, an optoelectronic package 10 includes an optoelectronic device 11 mounted on a wall 12 extending upward from a substrate 14 on the package floor 16. The substrate 14 is preferably a ceramic substrate which can be heated during the package assembly by running an electrical current through it, to create resistive heating. An optical fiber 18 extends through a nose tube 19 to an aperture 20 in the package wall 21 which is across form the optoelectronic device 19. This forms a fiber feedthrough joint 22. The nose tube 19 is preferably a Kovar tube with a gold-plated interior which is brazed to the side wall 21 of the package. The feedthrough joint 22 is hermetically sealed with a solder in a manner discussed below. The fiber 18 is held in alignment with the optoelectronic device 11 by a fiber lock joint 23, described in detail below.

In a preferred embodiment, the fiber 18 will be a commercially available sleeved gold metallized optical fiber. The sleeving 17 is preferably a high temperature plastic that is physically and chemically stable over a wide temperature range. Examples of suitable sleeving materials which are readily commercially available are Teflon, Tefzel, Hytrel, Polysilicone and Polyfluorosilicone.

Figure 5:
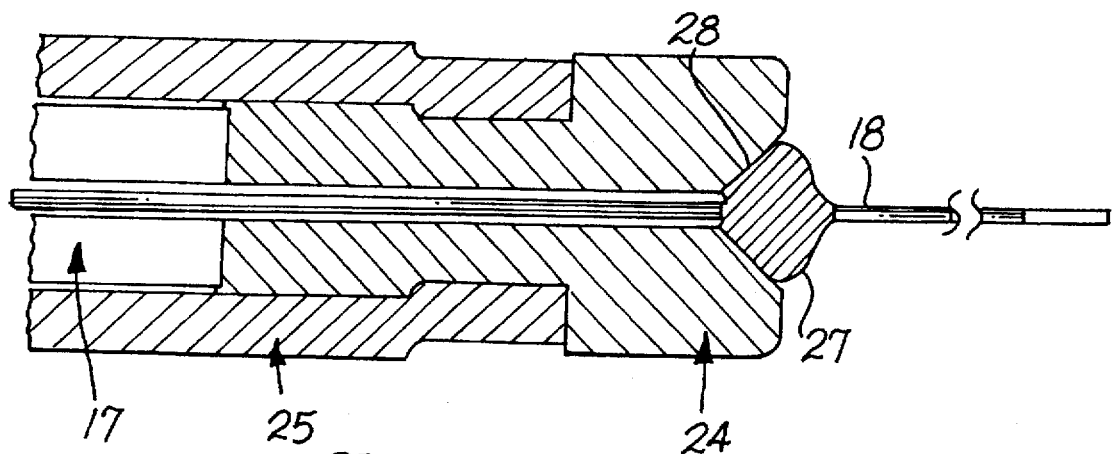
FIG. 5 is a cross-sectional view of an optical fiber with a seal tube sleeve insert mounted thereon in accordance with a preferred embodiment of the invention.

Referring to FIG. 5, the end of the fiber 18 which protrudes from the sleeving 17 is held in a cylindrical seal tube sleeve insert 24 which is held in place on the fiber end by heat shrink tubing 25. This forms a pigtail assembly with an integral seal tube sleeve insert 24 and fiber-optic cable 18 which is inserted into the package 10 as one unit.

The cylindrical seal tube sleeve insert 24 in the pigtail assembly acts as a guide to position the fiber 18 through the nose tube 19 and into the package 10, eliminating the possibility of damaging the fiber during package assembly. FIGS. 2a–2c illustrate how a fiber may be damaged without the sleeve insert 24 of the present invention. In typical prior art assemblies, the fiber 18 extends from a flexible sleeving 28 of Teflon or the like. The fiber 18 sometimes protrudes from the sleeving 26 at an angle of less than 180 degrees. When this occurs and the fiber 18 is inserted into the nose tube 19, the fiber end face occasionally brushes the inside of the nose tube as shown in FIG. 2c. The fiber end face may then be scratched or chipped, or the fiber may break. Even where damage does not occur, the assembly process can become expensive and time consuming since the operator must intervene by rotating the sleeving 26 until the fiber 18 finds the center of the nose tube 19.

Figure 3B:
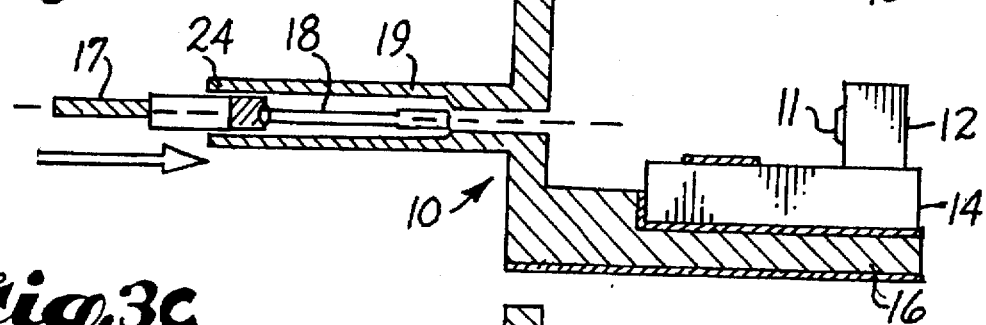
Figure 3C:
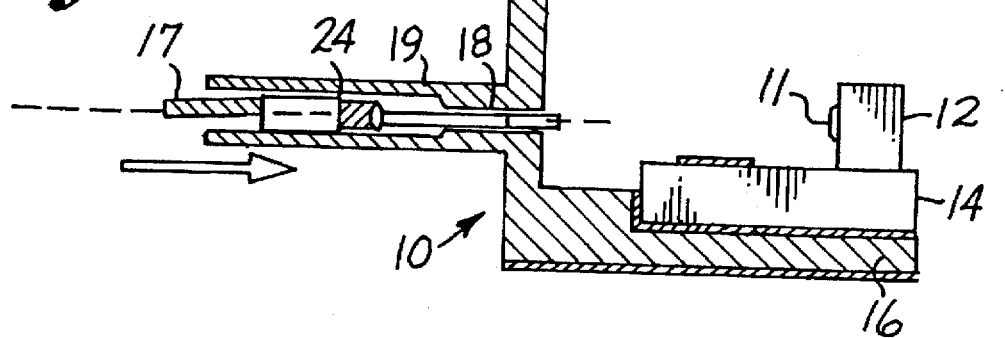
Figure 4:
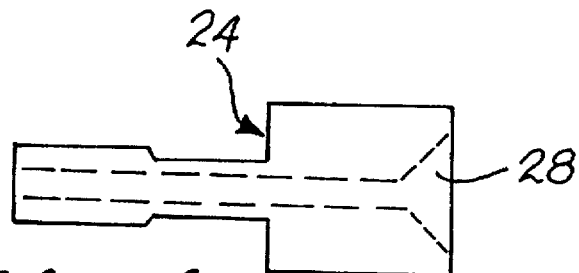
FIG. 4 is a detail view of a seal tube sleeve insert of the preferred embodiment.

FIGS. 3a–3c show how the seal tube sleeve insert 24 of the present invention guides the fiber 18 through the nose tube 19 so that the fiber 18 is centered within the nose tube 19. The sleeve insert 24, shown in detail in FIGS. 4 and 5, is preferably fabricated from a rigid material such as a ceramic, plastic or metal like copper or brass. In contrast to the flexible sleeving of the prior art, the rigidity of the seal tube sleeve insert 24 causes the fiber 18 to reproducibly protrude out of the seal tube sleeve insert 24 at an angle very near to 180 degrees. Thus, it is easily guided through the nose tube 19 without contact between the fiber end face and the nose tube wall. Excessive fiber bending inside the nose-tube 19 may cause fiber breakage after locking and sealing the fiber into the package. The cylindrical insert also limits the amount of bending at the fiber-to-solder hermetic seal interface after the fiber is inserted into the package and/or after the fiber is epoxied inside the package nose tube.

A seal between the sleeve insert 24 and fiber 18 is provided to prevent the solder flux and cleaning solvents used in the nose tube sealing process (described below) from migrating inside the insert 24 or sleeving 17. The sealing material should be a high temperature adhesive that is chemically resistant to solder flux and solder flux cleaning solvents. A suitable epoxy may be chosen for this purpose. It is generally difficult to reproducibly dispense and control the flow of sealing material (i.e. epoxy) at the fiber to sleeve insert interface, and the diameter of the epoxy bead. To overcome these difficulties, fabrication of the pigtail assembly is simplified by provision of a cupped cylinder insert end face. FIG. 5 shows a cross-section of the seal tube sleeve insert 24 with an epoxy bead 27 in the cup 28 on the end face of the insert. The cup 28 assures that the epoxy bead 27 will be of a diameter less than that of the sleeving, and also inhibits wicking of the epoxy into the Teflon sleeve. A more reproducible fiber-to-sheathing seal joint diameter is obtained which results in less rework, a lower scrap rate, and a higher production yield.

Figure 6A:
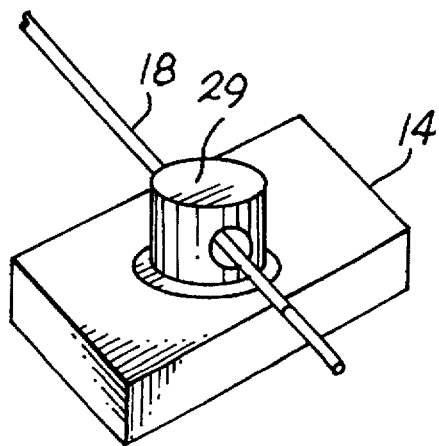
FIGS. 6A and 6B show the sequence of insertion of a fiber through a solder preform and reflowing the preform according to a preferred embodiment of the invention.
Figure 6B:
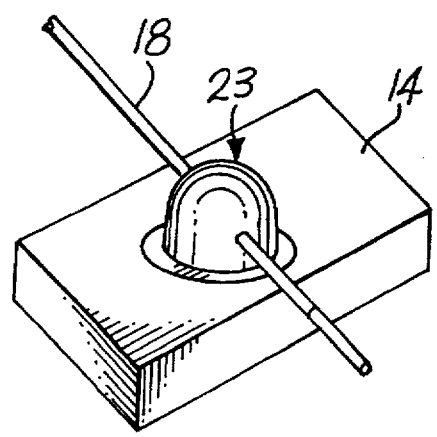

Referring now to FIGS. 1, 6a and 6b, the optical fiber 18 is held in proper alignment by a fiber lock joint 23 formed from a solder preform 29. After the fiber 18 is inserted through the preform 29 and aligned properly, the preform 29 is heated to flow around the fiber 18 and form the lock joint 23. The heating is preferably accomplished by resistive heating of the ceramic substrate 14. After this operation, the feedthrough joint 22 where the fiber 18 enters the package 10 is heated to form a hermetic seal. Since package dimensions are small, heating the feedthrough joint will result in heating of the fiber lock joint area. Thus, the soldering hierarchy is an important factor to consider in choosing solder materials for the hermetic seal and the fiber lock joint.

Another important factor is the ability of the solder material chosen for the lock joint to reliably hold the fiber in the desired position. Most commonly used soft solders such as SnPb and PbIn, are ill-suited to this application because they lack rigidity and tend to crack and deform over the temperature range they will be exposed to in an avionics environment.

Because of their mechanical properties, hard SnAg-based and SnSb-based solders such as 96.5Sn3.5Ag solder and 95Sn5Sb are the preferred choices for fiber locking. They have a relatively high Young's Modulus and exhibit low creep characteristics; i.e., they do not develop appreciable deformation with temperature change and therefore will reliably hold the fiber 18 in proper alignment when cycled through large temperature variations. The liquidus temperatures of these solders are within a workable range when one considers the soldering hierarchy. $T_{liquidus}$ for 96.5Sn3.5Ag is 221° C. and $T_{liquidus}$ for 95Sn5Sb is 240° C., while $T_{liquidus}$ for the preferred solder seal joint, 80Au20Sn (discussed more fully below), is 280° C. Due to its eutectic property and lower liquidus temperature 96.5Sn3.5Ag is the more preferable choice. Resistance to forming brittle $AuSn_4$ intermetallic at the metallized ceramic substrate-solder interface is another factor which makes 96.5Sn3.5Ag a preferable choice for the fiber lock joint.

Heating of the package sidewall 21 to seal the fiber 18 in the feed through joint 22 will cause some heating of the ceramic substrate 14. Thus, when designing the package 10, tradeoffs must be made between ceramic substrate thickness, fiber locking solder melting point, distance between the fiber lock joint and the package sidewall, and metal base thermal conductivity and thickness. In a package of practical dimensions, with the ceramic substrate 14 positioned about 0.060 inches from the sidewall, a 96.5Sn3.5Ag fiber locking solder will not reflow when the package sidewall is heated to about 300° C. during the sealing process because the ceramic substrate 14 acts as a thermal insulator between the fiber lock joint and the floor 16 of the package.

The metallurgy of the fiber-solder interface can be a source of performance problems. Brittle AuSn intermetallic may be formed at fiber-to-solder interface in solder lock joints containing SnAg-, SnSb- and SnPb-based solders. This brittle intermetallic at the fiber-to-solder interface can cause the fiber to delaminate from the solder. Delamination leads to the formation of metal flake particles which may contribute to electrical shorting, fiber shift, or attenuation of optical signal.

The ability of brittle $AuSn_4$ to form at the solder-to-fiber interface is greatly reduced by selectively pre-tinning the end of the gold plated fiber with a solder such as, e.g., 96.5Sn3.5Ag, 95Sn5Sb, or the like. Fixturing techniques known to those skilled in the art allow the selective tinning process to be performed both simply and reproducibly in a manufacturing environment. The resulting solder lock joint is extremely reliable.

In a preferred embodiment, about 0.100" at the end of the fiber is pre-tinned, so that only the portion of the fiber that contacts the fiber lock joint is pretinned. The gold plated area of the fiber that is not tinned is sealed into the nose tube with 80Au20Sn solder. No brittle intermetallic is formed between the gold plating on fiber and nose tube interior and the 80Au20Sn solder.

Although the invention has been described above with respect to a certain specific embodiment, the scope of the invention is not limited to the specific embodiment disclosed. Other designs within the spirit and scope of the invention will be apparent to those skilled in the field after receiving the above teachings. The scope of the invention, therefore, is defined by reference to the following claims.

What is claimed is:

1. An optoelectronic package comprising:

a housing having a sidewall with an aperture therethrough and a floor with a substrate thereon;

an optical fiber having an end extending through said aperture into said housing, a portion of the end of said fiber which is within said housing being metallized;

a solder lock joint on said substrate formed of a first solder which surrounds at least some of the metallized portion of said fiber so as to maintain it in a desired position with said housing; and a solder seal joint forming a hermetic seal between said aperture and said fiber, said solder seal joint being formed of a second solder, said second solder containing Au and Sn.

2. The invention of claim 1 wherein said metallization on said fiber includes Sn.

3. The invention of claim 2 wherein said first solder contains Sn and Ag.

4. The invention of claim 3 wherein said first solder is 96.5Sn3.5Ag.

5. The invention of claim 2 wherein said first solder contains Sn and Sb.

6. The invention of claim 5 wherein said first solder is 95Sn5Sb.

7. The invention of claim 1 wherein said second solder is 80Au20Sn.

8. The invention of claim 1 further comprising a nose tube mounted to the exterior of said housing with one end of said tube surrounding said aperture, whereby said fiber extends through said nose tube and said aperture, and wherein said nose tube has an Au plating on its interior surface.

9. The invention of claim 8 further comprising a rigid sleeve disposed about that portion of said fiber which lies within said nose tube.

10. The invention of claim 9 wherein said metallization on said fiber includes Sn.

11. The invention of claim 10 wherein said first solder contains Sn and Ag.

12. The invention of claim 11 wherein said first solder is 96.5Sn3.5Ag.

13. The invention of claim 10 wherein said first solder contains Sn and Sb.

14. The invention of claim 13 wherein said first solder is 95Sn5Sb.

15. The invention of claim 9 wherein said second solder is 80Au20Sn.

16. The invention of claim 9 further comprising a bead of epoxy forming a seal between said fiber and the end of said sleeve which is closer to said aperture.

17. The invention of claim 16 wherein said sleeve includes a cup on said end configured to receive said bead of epoxy.

* * * * *